US011340761B2

(12) United States Patent
Weber

(10) Patent No.: US 11,340,761 B2
(45) Date of Patent: May 24, 2022

(54) SYSTEMS AND METHODS FOR INDICATING ORGANIZATIONAL RELATIONSHIPS BETWEEN OBJECTS

(71) Applicant: Development Guild DDI, Inc., Brookline, MA (US)

(72) Inventor: Matthew Weber, Montclair, NJ (US)

(73) Assignee: Development Guild DDI, Inc., Brookline, MA (US)

( * ) Notice: Subject to any disclaimer, the term of this patent is extended or adjusted under 35 U.S.C. 154(b) by 0 days.

(21) Appl. No.: 16/585,703

(22) Filed: Sep. 27, 2019

(65) Prior Publication Data

US 2021/0096698 A1  Apr. 1, 2021

(51) Int. Cl.
*G06F 3/0482* (2013.01)
*G06F 3/0484* (2013.01)
*G06F 3/0488* (2013.01)
*G06F 3/0481* (2013.01)
*G06F 3/04883* (2022.01)
*G06F 3/04817* (2022.01)

(52) U.S. Cl.
CPC .......... *G06F 3/0482* (2013.01); *G06F 3/0484* (2013.01); *G06F 3/04817* (2013.01); *G06F 3/04883* (2013.01)

(58) Field of Classification Search
CPC ............... G06F 3/0482; G06F 3/04883; G06F 3/04817; G06F 3/0484
See application file for complete search history.

(56) References Cited

U.S. PATENT DOCUMENTS

| 6,252,597 | B1* | 6/2001 | Lokuge | G06F 3/0481 715/841 |
|---|---|---|---|---|
| 7,418,674 | B2* | 8/2008 | Robbins | G06T 11/206 715/764 |
| 7,681,150 | B2* | 3/2010 | Hsieh | G11B 27/34 715/854 |
| 8,028,250 | B2* | 9/2011 | Vronay | G06F 3/0482 715/853 |
| 8,065,603 | B2* | 11/2011 | Gossweiler, III | H04N 21/482 715/227 |
| 8,108,430 | B2* | 1/2012 | Wong | G06F 16/26 707/792 |
| 2003/0048309 | A1* | 3/2003 | Tambata | G11B 19/025 715/810 |

(Continued)

OTHER PUBLICATIONS

TreeView—Expand Animation, Mar. 7, 2017, 1 page (Year: 2017).*

(Continued)

*Primary Examiner* — Yongjia Pan
(74) *Attorney, Agent, or Firm* — Pillsbury Winthrop Shaw Pittman LLP

(57) ABSTRACT

Embodiments for improved data structuring for computer devices that provides efficient organization and navigation in a user interface in order to increase the amount and type of content that can be presented to a user, particularly with regard to small displays. For example, by emphasizing how data relates to other data (e.g., emphasizing the organizational structure) during navigation as opposed to after navigation, the embodiments provide an intuitive user interface for devices that indicates the relationship between data without the need for additional on-screen objects.

17 Claims, 9 Drawing Sheets

(56) References Cited

U.S. PATENT DOCUMENTS

| | | | |
|---|---|---|---|
| 2005/0091596 A1* | 4/2005 | Anthony | G06F 3/0482 715/712 |
| 2007/0168875 A1* | 7/2007 | Kowitz | G06F 3/0485 715/764 |
| 2009/0259975 A1* | 10/2009 | Asai | G06F 3/0482 715/850 |
| 2014/0164896 A1* | 6/2014 | Schlereth | G06F 40/18 715/217 |
| 2015/0046882 A1* | 2/2015 | Menyhart | G06F 3/04883 715/854 |
| 2015/0234548 A1* | 8/2015 | Pierre | G06F 3/0482 715/768 |
| 2016/0077684 A1* | 3/2016 | Liu | G06F 3/0481 715/765 |
| 2016/0179318 A1 | 6/2016 | Patel | |

OTHER PUBLICATIONS

Rachel Cope, CSS Transitions and Transforms for Beginners, Aug. 24, 2015, 12 pages (Year: 2015).*

CSS Expand / Contract Animation to Show/Hide Content, Jan. 8, 2018, 5 pages (Year: 2018).*

\* cited by examiner

SYSTEMS AND METHODS FOR INDICATING ORGANIZATIONAL RELATIONSHIPS BETWEEN OBJECTS

FIELD OF THE INVENTION

The invention relates to indicating organizational relationships between objects in a user interface.

BACKGROUND

With the influx of mobile and ubiquitous devices, the number of devices upon which a user may consume data has increased exponentially. Along with this increase, the size of devices upon which a user may consume data has decreased. For example, where once only a personal computer may have had the processing power, memory, and Internet connection to pull and display data, technology quickly advanced to allow such functionality to be achieved by portable laptop computers. Following laptop computers, this functionality was available on smartphones and now wearable devices (e.g., smartwatches). Despite the ability to shrink the components necessary to achieve the required processing power, memory, and Internet connection, the minimum size requirements for the manipulation and display of this content on any given device has remained the same.

For example, while screens for displaying content may shrink, the screen must remain a minimum size such that text displayed on that screen can be read by a user. Likewise, while the input mechanism for a device may have been implemented into a screen (e.g., via touchscreen technology) in order to minimize the overall size of a device. This increases the size requirements of the screen. For example, objects in a touchscreen display must be at least large enough for a user to select a different object using his or her finger. Finally, even if a screen is minimized to a size where content is at least both displayable and selectable, this size still presents problems for the user. Specifically, while content may be displayed and selected, conventional techniques for organizing and navigating this content are unavailable to a user. For example, conventional menu screens, drop-down displays, search bars, and other conventional data organizational structures and navigation techniques that rely on additional screen real estate to indicate how data relates to other data is unavailable.

For example, a typical hierarchical tree structure of display data, requires that a heading (or category) remains displayed while sub-headings (or sub-categories) are displayed. This structure intuitively informs a user on how certain data (e.g., a sub-category) relates to other data (e.g., a category). Likewise, a conventional drop-down menu that requires that a menu icon remain displayed while a user views the options under the drop-down menu, or a multiple window display arrangement is impracticable on smaller screens as the screen does not have available real estate to maintain this organizational structure. As yet another example, search bars require a user to input alphanumeric characters (thus devoting screen real estate to a virtual keyboard), require a display of search results, and require the display of the search query that was entered. If this information is not available, users may become confused over what word was search and whether or not these are the correct results.

SUMMARY

Accordingly, methods and systems are provided herein and improved user interfaces that solve the aforementioned problems. Specifically, embodiments disclosed herein relate to improved data structuring for computer devices that provides efficient organization and navigation in a user interface in order to increase the amount and type of content that can be presented to a user, particularly with regard to small displays. For example, by emphasizing how data relates to other data (e.g., emphasizing the organizational structure) during navigation as opposed to after navigation, the embodiments herein provide an intuitive user interface for devices that indicates the relationship between data without the need for additional on-screen objects.

More specifically, instead of transitioning to new displays, which may require larger display screens or the removal of already presented content, the methods and systems disclosed nested object lists within each other in order to enable a user to efficiently access and navigate content options without large display screen requirements. The activation of an object in the nested display causes the display to transition to a new object list using a transition that is both size efficient and intuitively informs a user regarding the organizational structure of the objects in the object list. For example, through the use of animation and graphical transitions that are dependent on how information relates to other information, the methods and systems herein provide user with an improved user interface.

For example, as related to hierarchical tree structure, conventional menu displays expanding horizontally. That is, as a user selects an item from the tree structure, the system generates a "branch" of the tree. This branch includes a list of items, each of which may themselves be selectable. Furthermore, in order to indicate the organizational relationships between the items of the branch and the items of the original tree, the items of the branch are offset in the horizontal direction. This process continues as a selection of an item in the branch causes another branch to be presented. For each new branch, the system further offsets the respective list of items further in the horizontal direction. As this process continues, the remaining horizontal screen space is reduced, and the horizontal width of the screen provides a final limit. That is, once the offset branches reach the horizontal limit of the screen, the organizational relationships between data can no longer be displayed using the hierarchical tree structure. This problem is compounded on devices with limited screen sizes (e.g., portable, handheld, and/or wearable electronic devices). In such devices, the number of branches, if any, that may be traversed, while the organizational relationship is displayed, is extremely limited. As described herein, the systems and methods for indicating organizational relationships between objects in a user interface allows for infinite branches (or levels) of hierarchical data to be traversed easily and intuitively on any size screen while maintaining full readability. The systems and methods also allow for circuitous graph data (as opposed to hierarchical tree data, which is never circuitous) to be displayed.

In one aspect, the disclosure relates to improvements for navigating media content on an electronic device. For example, (i) the system may generate for display, in a user interface displayed on the portable electronic device, a first plurality of objects, (ii) the system may display a list of selectable icons, and (iii) the system may then receive a user selection of a first object in the first plurality of objects and, in response, may determine a second plurality of objects related to the first object. As an example, in response to a user selecting a category, the system may present items within that category.

The system may then generate for display, using a first transition graphic, a second plurality of objects to replace the first plurality of objects in the user interface. For example, in order to minimize the amount of objects and/or screen space necessary to indicate to the user the organizational relationship between the first object and the second plurality of objects, the system may rely on a first transition graphic to indicate this information. The first transition graphic may take various forms in order to convey this information. For example, the first transition graphic may comprise an animation of the second plurality of objects transitioning from a folded state to an unfolded state in a first direction. Unlike conventional techniques, the unfolding animation provides an intuitive indicating that the second plurality of objects relates to the first object.

The system may then store an order in which the first plurality of objects and the second plurality of objects were generated for display. The system may then receive a user input and in response, replace, using a second transition graphic, the second plurality of objects with the first plurality of objects based on the order. By using a difference transition graphic, the user intuitive understands that there is a different organizational structure between the first object and the second plurality of objects and the first plurality of objects and the second plurality of objects. For example, a perspective of one or more of the second plurality of objects may change during the first transition graphic while a level of clarity of one or more of the second plurality of objects may change during the second transition graphic. Other features of the transitions may also be used to reinforce the organizational relationship of data to the user. For example, the first transition graphic comprises an animation with a first time length, and the second transition graphic comprises an animation with a second time length. The system may configure the first time length to be longer than the second time length as the longer time length will allow the user more time to learn the organizational relationship.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
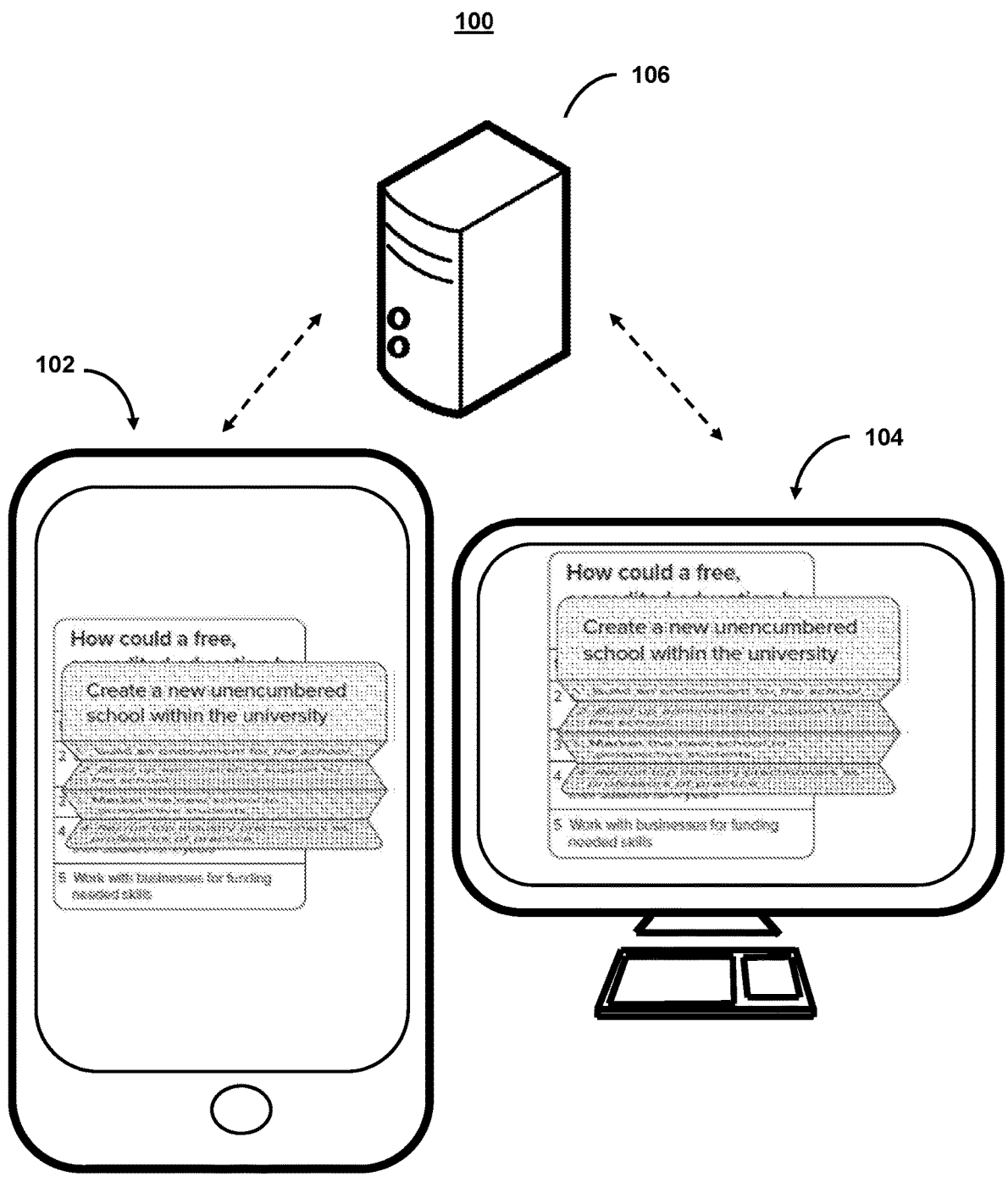
FIG. 1 shows an illustrative system for navigating media content on an electronic device, in accordance with one or more embodiments FIGS. 2A-2F respectively show an illustrative example of using transition graphics to indicate organizational relationships between data, in accordance with one or more embodiments.

FIG. 1 shows an illustrative system for navigating media content on an electronic device, in accordance with one or more embodiments. The devices shown in FIG. 1 may have multiple types of data structures to which the embodiments described herein may apply.

For example, data in the devices shown in FIG. 1 may be structured as arrays, files, and/or lists. In an array data structure, data may be a homogeneous and contiguous collection of the same data types. In such embodiments, transition graphics may be used to switch between different arrays in order to indicate the organizational structure of the data, while no transition graphics are used when traversing through data in a single array. In a file data structure, file data structure is primarily used for organizing large amounts of data which is not in the primary storage of the system. In such embodiments, transition graphics may be used to switch between different files in order to indicate the organizational structure of the data, while no transition graphics are used when traversing through data in a single file. In a list data structure, data may be arranged in linear or non-linear lists. In such embodiments, transition graphics may be used to switch between different linear lists in order to indicate the organizational structure of the data, while no transition graphics are used when traversing through a single linear list. Alternatively or additionally, transition graphics may be used to switch between different pathways and/or branches in linear lists in order to indicate the organizational structure of the data. For example, a non-linear list may include graph structures or tree structures. In a graph structure, the graph data structure is used to represent a network and comprises vertices and edges (to connect the vertices). In order to indicate to a user, the organizational relationships between different vertices and/or groups of vertices, the system may institute transition graphics between data from these different groups. In a tree data structure, data is organized by nodes connected in a particular arrangement. The tree data structures consist of a root node which is further divided into various child nodes and so on. The number of levels of the tree is also called height of the tree. In order to indicate to a user, the organizational relationships between different branches of the tree structure, the system may institute transition graphics between data from these different branches.

As referred to herein, a "transition graphic" may include any graphic that indicates to a user an organizational relationship between different groups of data. The transition graphic may include multiple transition effects, which may be applied to objects in a user interface. The object may represent data in the data structure. In order to indicate organizational relationships between the data, the system may apply different transition graphics to different groups of objects and/or different transition effects to objects in a group of objects. The transition effects may be selected based on one or more characteristics of the group of data (e.g., a category) and/or the underlying data. For example, the more distinct groups of data are, the more severe the transition graphic. The system may increase the length, size (e.g., number of pixels in a screen used to perform the transition graphic), complexity (e.g., number of different determinations and/or process necessary to perform the transition), audio/visual data (e.g., number and volume of sounds added), and/or "states" (as described below in relation to FIGS. 2A-2F) to indicate the differences between data.

Transition graphic may be assigned to groups of data based on the organizational relationship. For example, the system may assign a transition effect to a group of objects corresponding to child nodes that stem from a single parent node. The system may assign a transition effect to a group of objects that share a specific characteristic. In another example, the system may assign a transition effect to a group of objects that share a similarity metric above a particular threshold. The system may assign a transition effect to a group of objects based on whether or not the system has already generated for display a transition effect showing the organizational relationship for the group of objects. For example, the first time a user navigates to a plurality of objects, the system may select a first transition graphic. The second time a user navigates to the plurality of objects, the system may select a second transition graphic.

It should be noted that a transition graphic may take multiple forms in order to indicate organizational relationships between data while minimizing the screen space required. In some embodiments, the transition graphic may modify the perspective and/or angle at which content is displayed in order to allow content to remain visible and/or legible. Additionally or alternatively, the transition graphic may provide an animation that indicates the relationship of data to other data by using animations featuring nested lists. For example, in some embodiments, the transition graphic may appear as an accordion style animation (e.g., as shown in FIGS. 2A-2F). In some embodiments, the transition graphic may comprise a stack of objects that arranges itself vertically to appear as a list, without additional animations.

In some embodiments, the transition graphic may include the horizontal and/or vertical expansion of one of more selectable items (e.g., revealing additional items related item in the expanded space). In some embodiments, the transition graphic may a rotation either in a direction with the plane of the display screen of the device or in a direction orthogonal to the plane of the display screen of the device.

In some embodiments, the transition graphic may modify the perspective of an item. For example, the transition graphic may appear to rotate a previously two-dimensional object in three dimensions and/or give the appearance of depth to a two-dimensional object. In some embodiments, visual characteristics (e.g., size, clarity, shape, color, font, style, perspective and/or thickness) of an object or data in the object may be modified during a transition graphic. In some embodiments, the speed and/or direction of a transition graphic (e.g., as the transition graphic moves from one state to another) may be modified.

As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of user terminal 104, those operations may, in some embodiments, be performed by components of server 106. In some embodiments, the various computers and systems described herein may include one or more computing devices that are programmed to perform the described functions.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. In some embodiments, FIGS. 2A-2F may be displayed on mobile device 102 and/or user terminal 104. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to the verification service (e.g., either transmitting verification requests, receiving verification requests, and/or processing verification requests). For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. The electronic storage may be used to store a database listing a hierarchical tree for the first object and relationships between objects and tree nodes in the hierarchical tree.

FIGS. 2A-2F respectively show an illustrative example of using transition graphics to indicate organizational relationships between data, in accordance with one or more embodiments. For example, FIGS. 2A-2F show device 200 as a user navigates through pluralities of objects. In FIGS. 2A-2F the pluralities of objects are shown as a pair of nested lists. It should be noted however that transition graphics may be used to indicate organizational relationship in multiple types of arrangement.

Figure 2A:
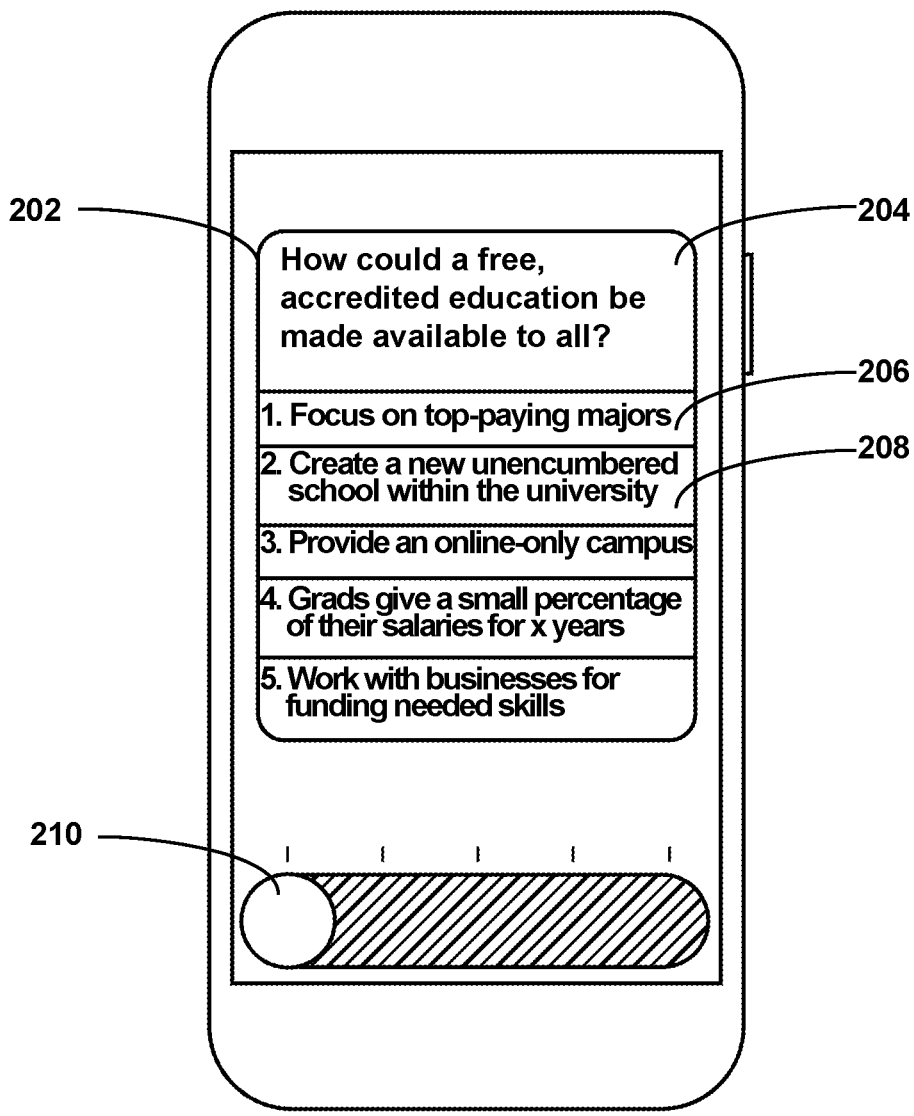

FIG. 2A shows user device 200. In some embodiments, user device 200 may be a portable electronic device (e.g., mobile device 102 (FIG. 1)). User device 200 is currently displaying first plurality of objects 202. As shown in FIG. 2A, first plurality of objects 202 may be structured as a list of items or a menu of selectable icons. First plurality of objects 202 includes header 204, first object 206, and second object 208. In some embodiments, header 204 may correspond to a category to which first object 206 and second object 208 belong. For example, header 204 may correspond to a node in a hierarchical tree data structure. First object 206 and second object 208 may correspond to child nodes that stem from the tree node corresponding to header 204.

FIG. 2A also includes icon 210. Icon 210 may indicate a progression along a data structure entered by a user. For example, due to the limited space requirements, the system may use one or more icons (in addition to transition graphics) to indicate organizational relationships between data. In some embodiments, icon 210 may comprise one or more graphical elements that may also transition from one state to another as a user progresses through a hierarchical tree data structure. For example, as shown in FIG. 2A icon 210 may move along a track bar that includes markings that represent levels of a hierarchical tree data structure. By moving along the track, icon 210 may indicate an organizational relationship of a currently displayed plurality of objects relative to other objects.

In some embodiments, icon 210 may include additional textual, graphical, and/or audio components that indicate an organizational relationship of a currently displayed plurality of objects. In any of these embodiments, the system may select an icon (e.g., from a plurality of icons) and/or a component of an icon based on a current level in a hierarchical tree data structure. It should also be noted that in some embodiments, each object in first plurality of objects 202 may be selectable. For example, in response to a user selection of object 206, the system may generate and/or reveal additional objects. However, in some embodiments, one or more objects in first plurality of objects 202 may not be selectable. In response to a user selection of object 206, the system may not generate and/or reveal additional objects. In some embodiments, the system may generate a user alert that there are no additional objects corresponding to a given object and/or the object may appear with a different graphical feature (e.g., color) to indicate this fact.

Figure 2B:
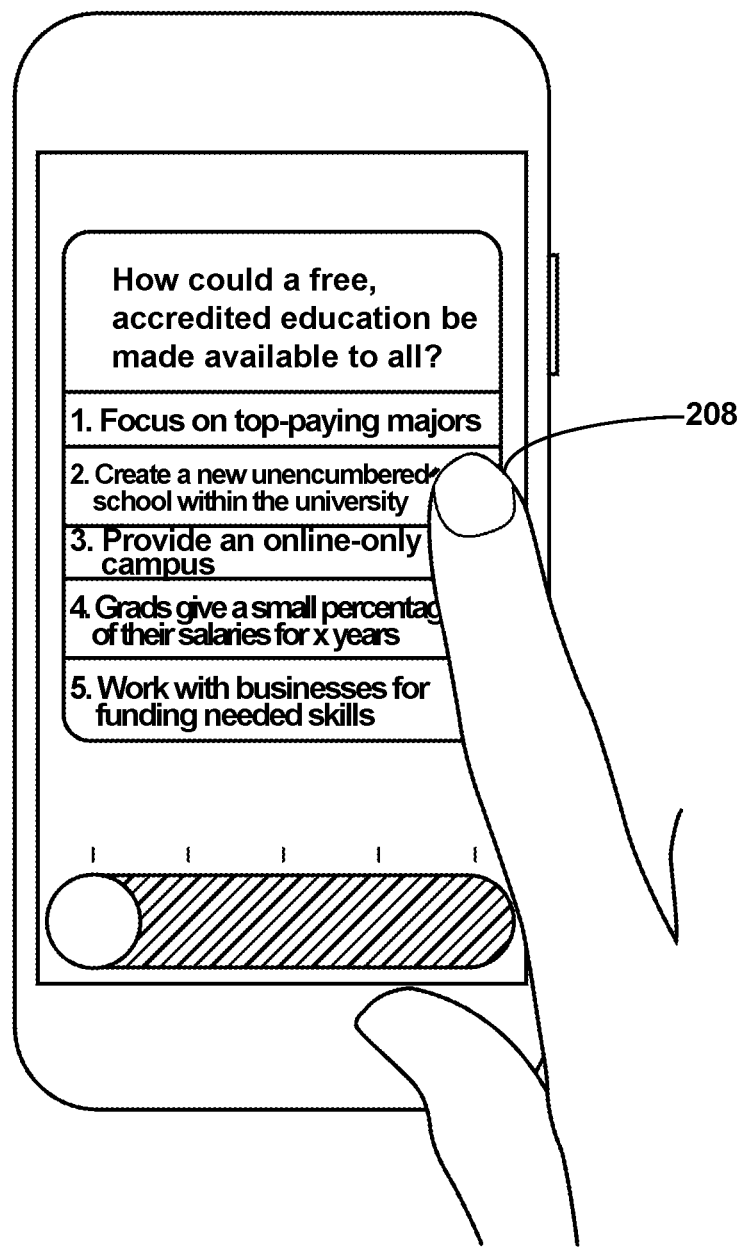

In FIG. 2B, the system has received a user input selecting second object 208. As shown in FIG. 2B, the system has received a user input via a touchscreen interface of user device 200. It should be noted that the system may receive user inputs through one or more means including, a remote control, mouse, trackball, keypad, keyboard, touch screen, touchpad, stylus input, joystick, voice recognition interface, and/or other user input interfaces. Additionally or alternatively, the system may receive a gesture input. As referred to herein, the term "gesture" should be understood to include a movement of one or more portions of a user's body part (e.g., finger, hand, face, etc.), across an input device and/or interface.

In some embodiments, the system may distinguish between a "tap" input (e.g., a keyboard entry, a mouse click, a "tap" on a touchscreen, etc.) and a gesture input. For example, in response to a tap input, the system may select a first transition graphic to perform (and/or one or more plurality of objects to perform the first transition graphic on). In response to a gesture input, the system may select a second transition graphic to perform (and/or one or more plurality of objects to perform the second transition graphic on).

Figure 2C:
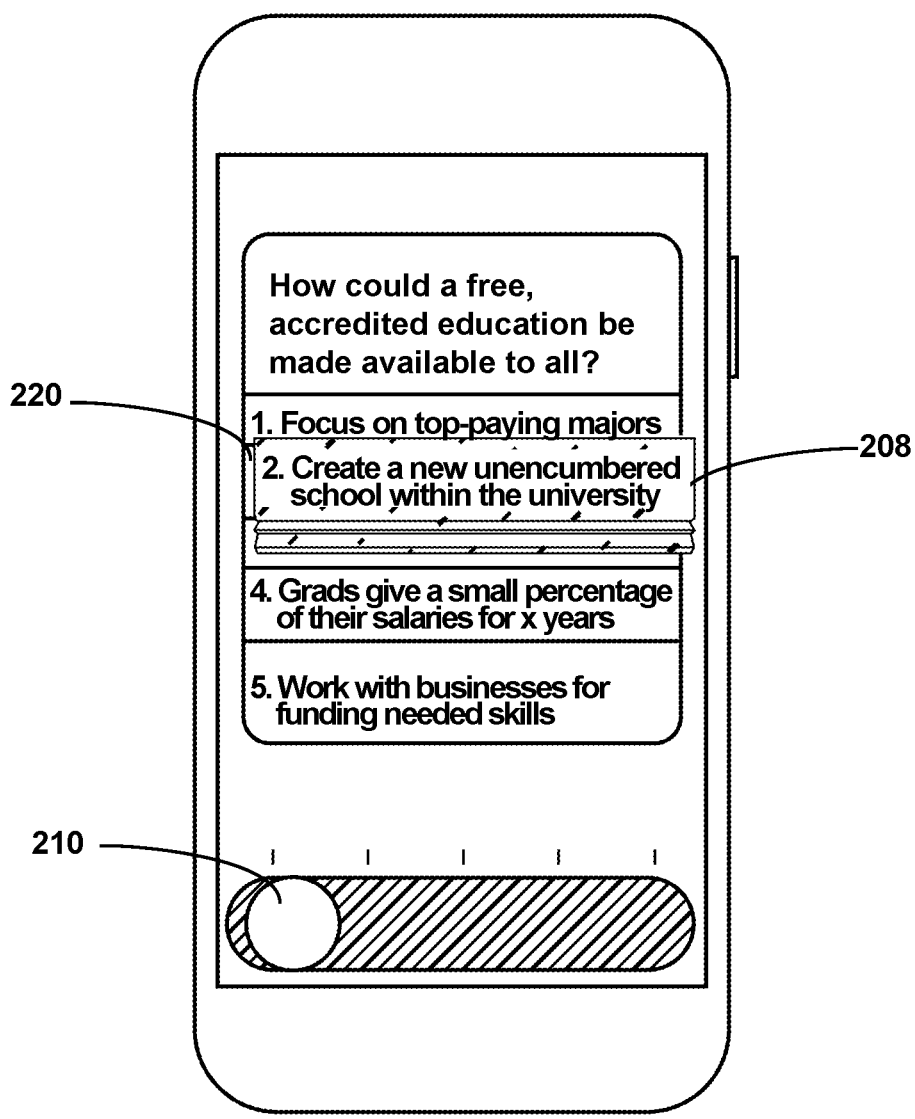
Figure 2D:
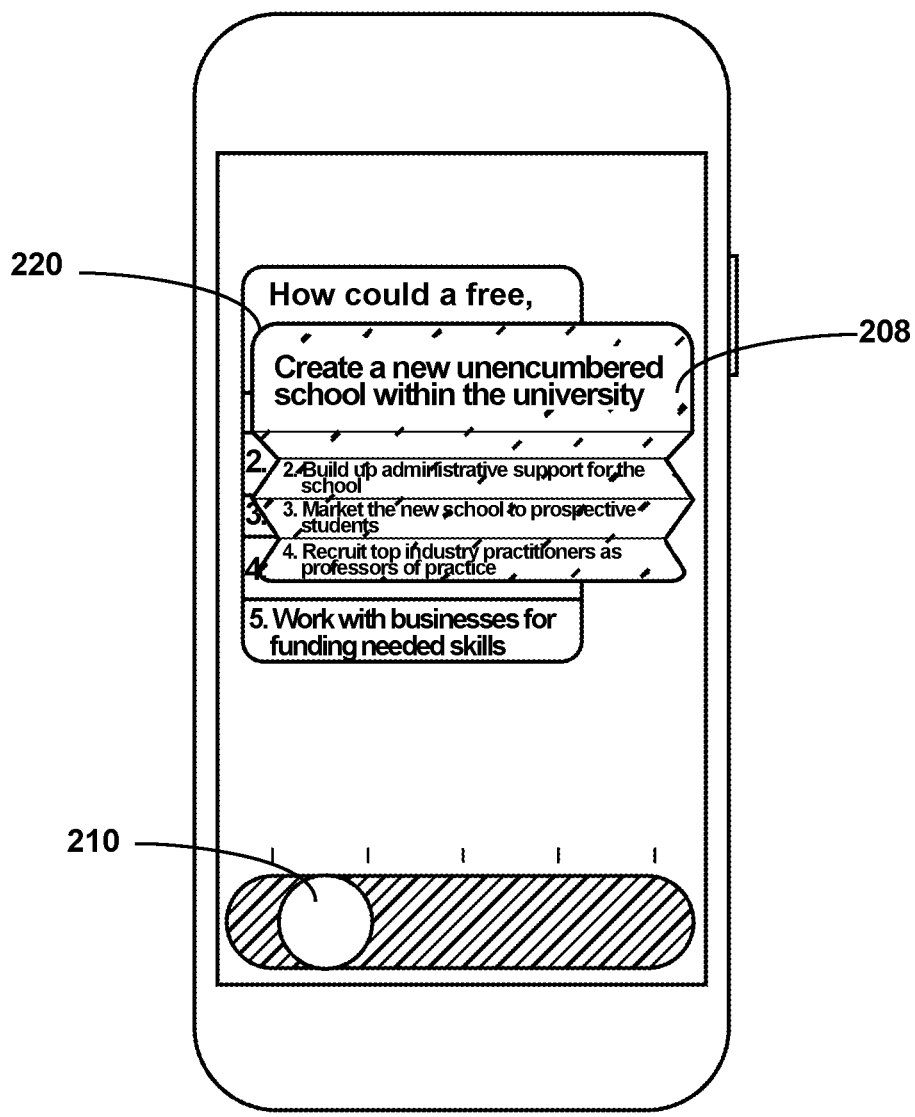
Figure 2E:
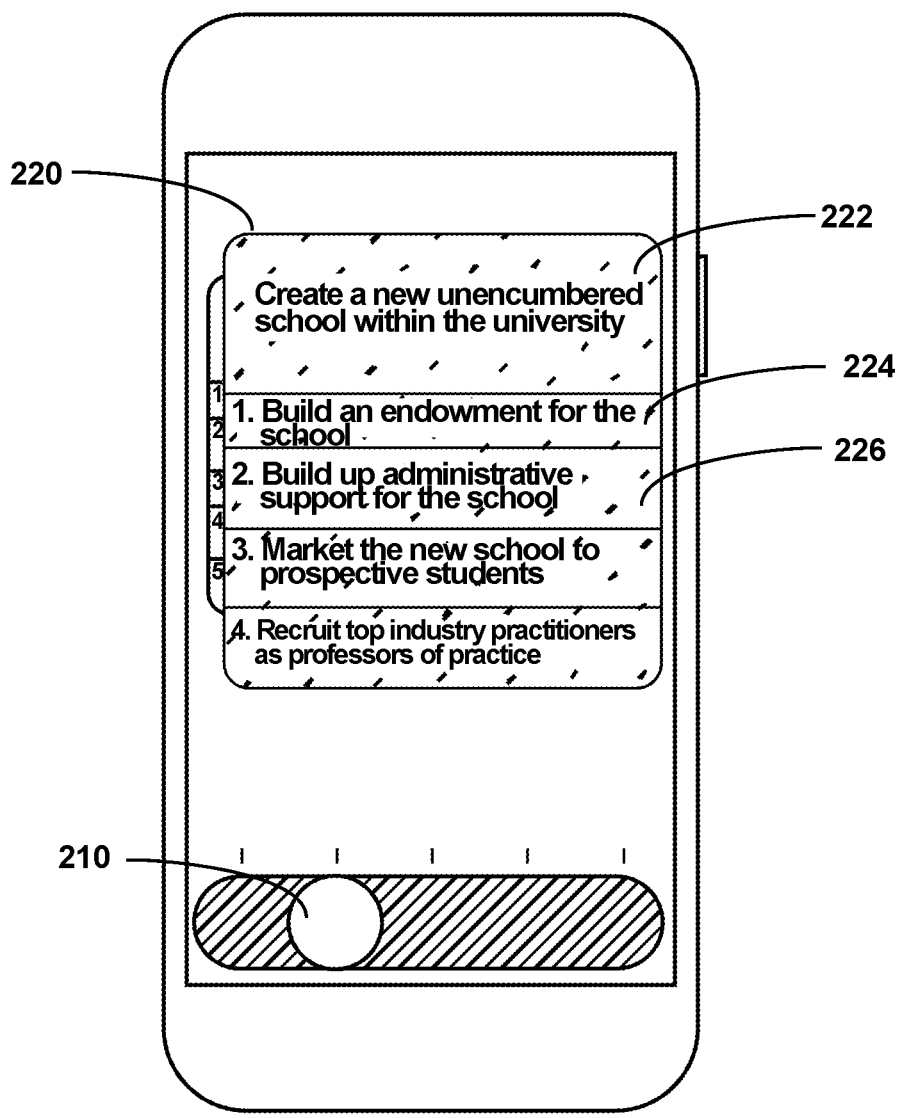

In FIGS. 2C to 2E, the system is generating for display, using a first transition graphic, a second plurality of objects to replace the first plurality of objects in the user interface, wherein the first transition graphic comprises an animation of the first plurality of objects transitioning from a folded state to an unfolded state in a first direction. For example, the system may generate a transition graphic in which the plurality of objects unfolds like an accordion.

In order to generate this animation for display, the system may use one or more techniques. For example, in order to generate a transition graphic for display the system may generate one or more states (e.g., as shown in relation to FIGS. 2B-2E). Each state may include a plurality of characteristics. For example, each state may correspond to a given size, shape, plane of display, angle of display, resolution, clarity, and/or perspective in which the object is displayed. The progression of the object through a series of states may comprise a transition graphic. In one example, the transition graphic may comprise an animation of the first plurality of objects transitioning from a first plane to a second plane in a second direction, wherein both the first plane and the second plane are parallel to a display screen of the portable electronic device.

For example, FIGS. 2C-2E illustrate second plurality of objects 220 transitioning through a plurality of states. In FIG. 2C, second plurality of objects 220 begins its transition graphic. In this first state of the transition graphic, second plurality of objects 220 appears "folded" to a user. To generate the "folded" effect, the system modifies characteristics corresponding to the different objects in second plurality of objects 220. For example, as shown in FIG. 2E, second plurality of objects 220 includes header 222, first object 224, and second object 226. In some embodiments, header 222 may correspond to a previously selected object (e.g., second object 208 (FIG. 2A)). For example, each object in second plurality of objects 220 may correspond to a child node of a node corresponding to a previously selected object (e.g., second object 208 (FIG. 2A)). During transition graphics, the system may generate for display one or more objects in one or more states. A given state may have one or more characteristics applied to the object. The transition graphic may then comprise the display of an object transitioning through one or more states.

For example, the system may generate for display a first object transitioning, in a first direction, from a first plane to a second plane, wherein the first plane is orthogonal to a display screen of the electronic device, and wherein the second plane is parallel to the display screen of the electronic device. The system may also generate for display a second object transitioning, in a second direction, from the first plane to the second plane, wherein the first direction is opposite to the second direction. The various states through which the transition graphic proceeds may correspond to the various angles that the first plane passes through as it transitions from being orthogonal to a display screen of the electronic device to being parallel to the display screen of the electronic device. It should be noted that in some embodiments, in which a perspective of the object changes, the various states through which the transition graphic proceeds may correspond to different vanishing points being used.

In FIG. 2C, header 222, first object 224, and second object 226 (and textual information displayed thereon) are not yet legible to a user as characteristics of these objects (e.g., size, shape, plane of display, angle of display, resolution, clarity, and/or perspective) prevent the objects from being displayed. As the transition graphic progress as shown in FIG. 2D, header 222, first object 224, and second object 226 (and textual information displayed thereon) are more legible to a user as the characteristics of these objects has changed. Finally, in FIG. 2E, as the transition graphic ends, header 222, first object 224, and second object 226 (and textual information displayed thereon) are legible to a user as the characteristics of these objects no longer prevent the objects from being clearly displayed.

In some embodiments, different objects may have different transition graphics. For example, the system may change a perspective of one or more of the second plurality of objects during a first transition graphic, and the system may change a level of clarity of one or more of the second plurality of objects during a second transition graphic. In some embodiments, the different transition graphics may be applied to different object simultaneously. For example, the system may generate a transition graphic with a plurality of planes, each of which is parallel to the display screen of the electronic device. The transition graphic may further include transition effects in which objects are moved in a first direction (e.g., a vertical direction in the plane of the display screen) and a second direction (e.g., a horizontal direction in the plane of the display screen). The system may, additionally or alternatively, generate for display a first plurality of objects transitioning, in a third direction, from a third plane to a second plane. For example, the third plane and second plane may be parallel to the display screen of the electronic device, and the third plane may appear in front or behind the second plane. The third direction may therefore be in a plane that is orthogonal to the display screen of the electronic device. For example, the first plurality of objects may appear to move from a position that is further from a user of the electronic device (e.g., in the background of the user interface) to a position that is closer to the user of the electronic device (e.g., in the foreground of the user interface).

The system may simultaneously generate for display a second plurality of objects transitioning, in the third direction, from the second plane to a fourth plane, wherein the second plane and fourth plane are parallel, but different, to the display screen of the electronic device. For example, the second plurality of objects may appear to move from a position that is closer to a user of the electronic device than an object in a third plane (e.g., the second plane is in front of the third plane from the perspective of the user), but further from the user of the electronic device than an object in a first plane (e.g., the second plane is behind of the first plane from the perspective of the user). The system may then generate a graphic that appears to move the second plurality of objects to a fourth plane, which may appear further from the user of the electronic device than an object in the third plane (e.g., the fourth plane is behind of the third plane from the perspective of the user).

Alternatively, the second plurality of objects may appear closer to the user of the electronic device than an object in the first plane (e.g., the fourth plane is in front of the first plane from the perspective of the user). For example, if the first plane corresponds to the plane of the display screen of the electronic device, the transition graphic may appear to move the second plurality of object "out of" the screen. That is, from the perspective of the user, the second plurality of objects may appear to have moved to a plane behind the user (and thus no longer visible on the display screen).

In some embodiments, the transition graphics may take different lengths of time to complete. For example, a first transition graphic may comprise an animation with a first time length and a second transition graphic comprises an animation with a second time length. The system may further modify the length of time corresponding to a given transition graphic based on an organizational relationship of the underlying data. For example, in order to convey an organizational relationship in an intuitive manner, the system may select a longer length of time for transitions that show new organizational relationships between data. For example, the system may assign a first transition graphic to a first plurality of objects based on the first plurality of objects being generated for display before. The system may then assign a second transition graphic to a second plurality of objects based on the second plurality of objects not being generated for display before.

Additionally or alternatively, the system may select transition graphics based on the order in which organizational relationships between data were generated for display. For example, the system may assign a first transition graphic to a first plurality of objects based on the first plurality of objects being generated for display before a second plurality of objects. The system may then assign a second transition graphic to the second plurality of objects based on the first plurality of objects being generated for display before the second plurality of objects.

In some embodiments, a transition graphic may include one or more transition effects being applied to one or more objects. For example, in order to generate for display a transition graphic that comprises an animation of a first plurality of objects transitioning from a folded state to an unfolded state, the system may apply one or more transition effects on objects of the first plurality of objects. For example, the system may generate for display a first object transitioning, in a first direction, from a first plane to a second plane, wherein the first plane is orthogonal to a display screen of the electronic device, and wherein the second plane is parallel to the display screen of the electronic device. The system may simultaneously generate for display a second object transitioning, in a second direction, from the first plane to the second plane, wherein the first direction is opposite to the second direction.

In some embodiments, the system may assign a transition effect based on a characteristic of an object. For example, in response to determining that an object has a first characteristic, the system may assign a first transition effect to the object. In response to determining that the object has a second characteristic, the system may assign a second transition effect to the object. The characteristic may include any data related to the object, including a position of the object in a plurality of objects (e.g., a list of objects). For example, if the object is first in the list, a first transition effect may be applied. If the object is second in the list, a second transition effect may be applied. The system may determine a first position of the first object in a plurality of objects. The system may then determine a position of a second object in the plurality of objects.

Additionally in FIGS. 2C to 2E, the system is generating for display icon 210 in various states. For example, the system may modify icon 210 based on a level number corresponding to the current level in the hierarchical tree data structure, a percentage of levels progressed through in the hierarchical tree data structure, and/or a percentage of levels not yet progressed through in the hierarchical tree data structure. Alternatively or additionally, the system may select an icon (e.g., from a plurality of icons) and/or a component of an icon based on the child nodes and/or parent nodes associated with a currently displayed plurality of objects. For example, the system may modify icon 210 based on a characteristic associated with a parent node (e.g., a node corresponding to header 204) of a currently displayed plurality of objects, based on a number of child nodes, grandchild nodes, and/or parent nodes, etc. Additionally or alternatively, the system may select an icon (e.g., from a plurality of icons) and/or a component of an icon based on user actions. For example, the system may modify icon 210 based on the number of times a user has viewed the currently displayed plurality of objects, based on user profile information that indicates a user may prefer one or more objects in the currently displayed plurality of objects, etc.

Figure 2F:
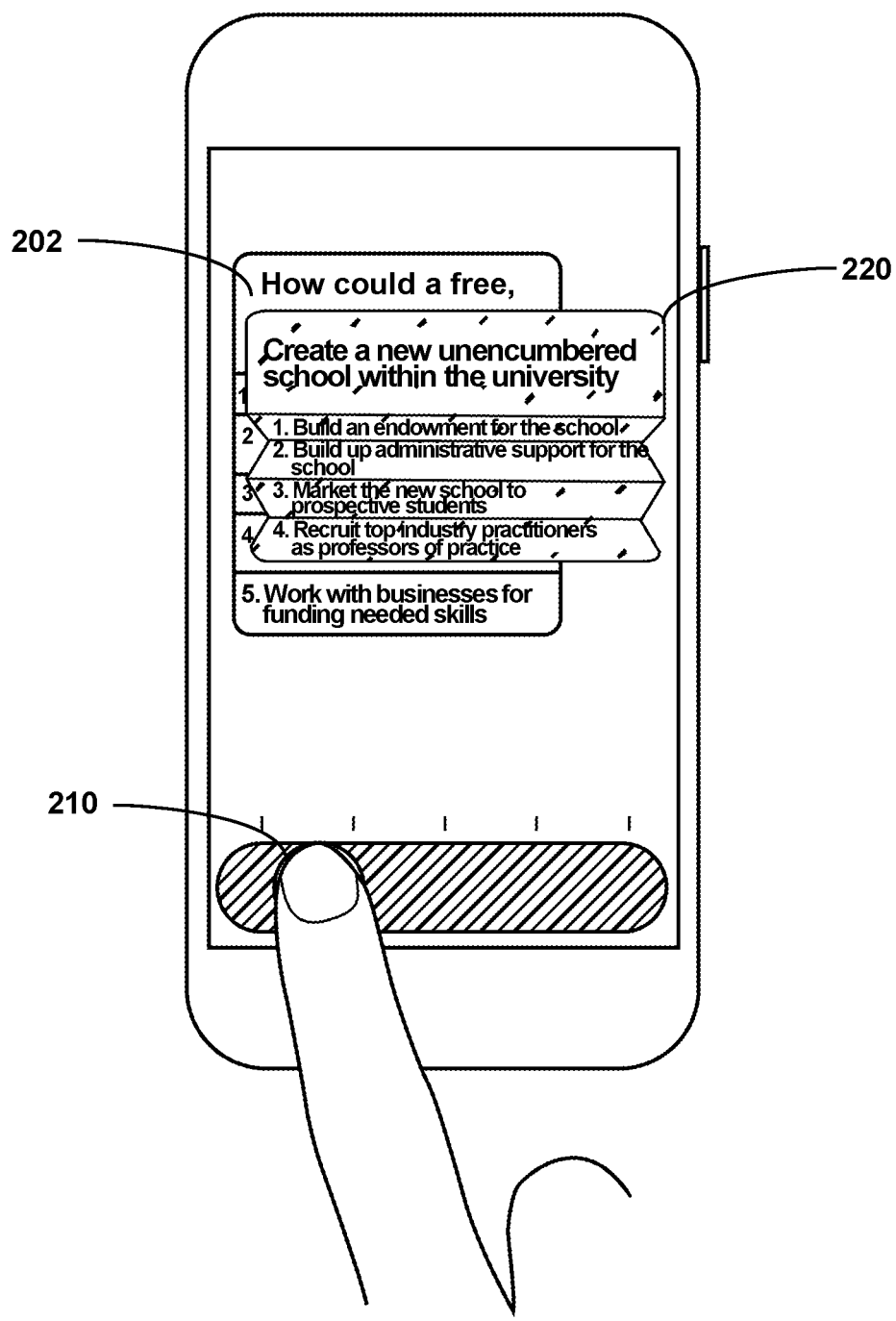

FIG. 2F shows the system executing a second transition graphic in response to a user gesture. For example, in response to detecting a user gesture on icon 210, the system transitions from a display of second plurality of objects 220 to a display of first plurality of objects 202. As the system determines that the organization relationship between first plurality of objects 202 and second plurality of objects 220 has already been indicated (e.g., via the first transition graphic), the system selects a different transition graphic. The different transition graphic indicates to the user that this is not a new organizational relationship between the data. As this is not a new organizational relationship, the system may select a less severe transition graphic. For example, the system may select a transition graphic that has a shorter length, smaller size (e.g., number of pixels in a screen used to perform the transition graphic), less complexity (e.g., number of different determinations and/or process necessary to perform the transition), uses less audio/visual data (e.g., has a lower number and volume of sounds added), and/or fewer states (as to indicate the differences between data.

Figure 3:
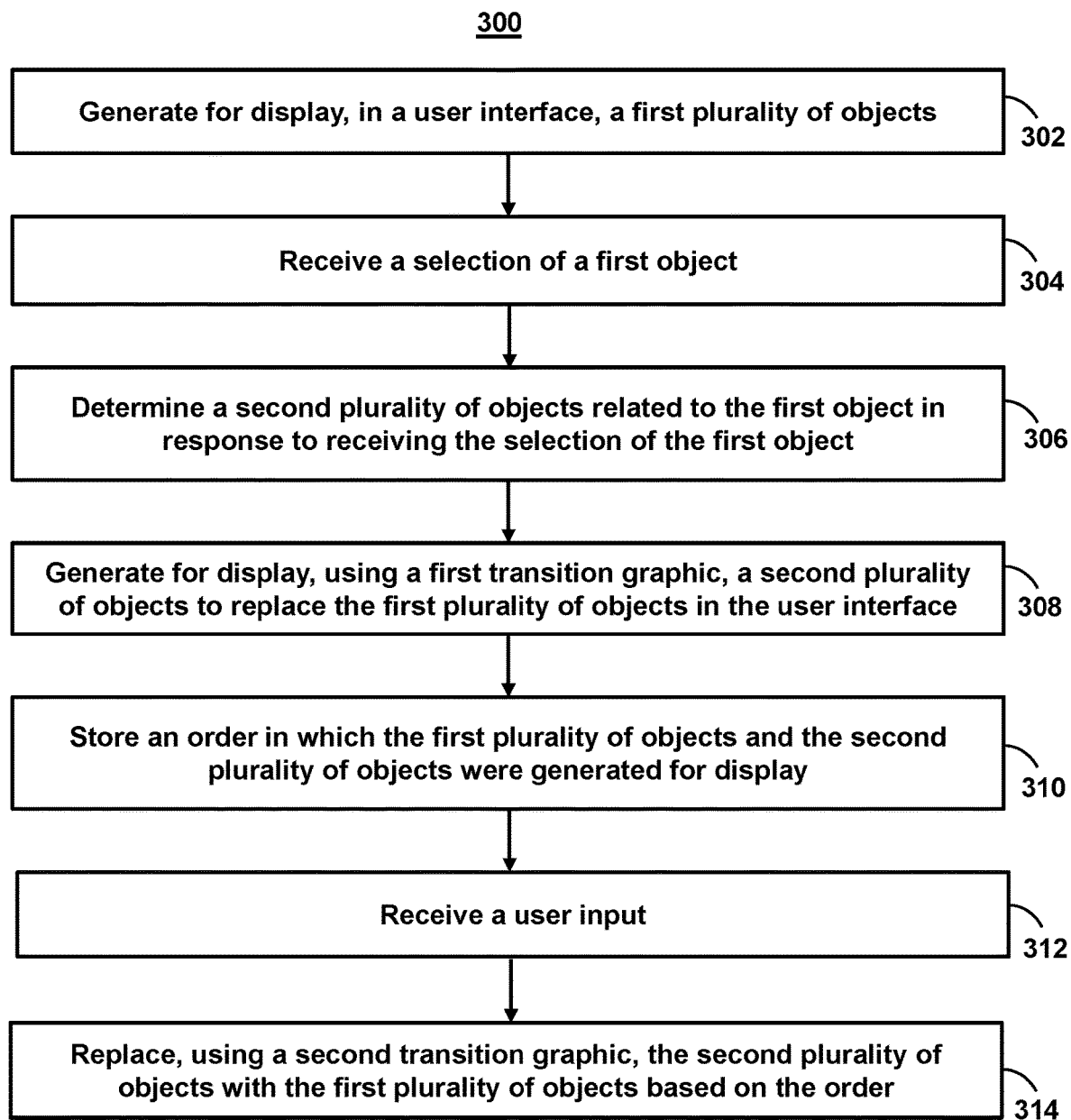
FIG. 3 shows a flowchart of steps for navigating media content on an electronic device using transition graphics that indicate organizational relationships between data, in accordance with one or more embodiments.

FIG. 3 shows a flowchart of steps for navigating media content on an electronic device using transition graphics that indicate organizational relationships between data. For example, the system may assign a transition graphic to a group of objects corresponding to child nodes that stem from a single parent node. The system may assign a transition graphic to a group of objects that share a specific characteristic. In another example, the system may assign a transition graphic to a group of objects that share a similarity metric above a particular threshold. In another example, the system may assign a transition graphic to a group of objects based on whether or not the system has already generated for display a transition effect showing the organizational relationship for the group of objects. The first time a user navigates to a plurality of objects, the system may select a first transition graphic. The second time a user navigates to the plurality of objects, the system may select a second transition graphic.

At step 302, process 300 generates for display, in a user interface, a first plurality of objects. For example, as shown in FIG. 2A, the system may generate for display first plurality of objects 202, which may include first object 206, and second object 208. For example, the system may generate a first list of items.

At step 304, process 300 receives a selection of a first object in the first plurality of objects. For example, as shown in FIG. 2B, a user may select an object shown in the user interface of user device 200. For example, the system may receive a selection of an item in the first list of items.

At step 306, process determines a second plurality of objects related to the first object in response to receiving the selection of the first object. For example, the system may access a database listing a hierarchical tree for the first object and relationships between objects and tree nodes in the hierarchical tree. The system may determine a tree node in the hierarchical tree for the first object, then a first child node and a second child node for the tree node, and then determine the first child object and the second child object related to the first child node and the second child node, respectively. For example, the system may determine a category of sub-items that correspond to the previously selected item.

At step 308, process 300 generates for display, using a first transition graphic, and a second plurality of objects to replace the first plurality of objects in the user interface. For example, first transition graphic comprises an animation of the second plurality of objects transitioning from a folded state to an unfolded state. For example, the system may generate an animation showing a transition from the first list of items to a second list of items. The second list of items being the category of sub-items that correspond to the previously selected item.

At step 310, process 300 stores an order in which the first plurality of objects and the second plurality of objects were generated for display. For example, in some embodiments, the system may apply one or more transition graphics and/or transition effects based on an order in which objects were displayed. For example, the system stores that the first list of times was presented to the user before the second list of items.

At step 312, process 300 receives a user input. For example, the system may receive a user gesture on the user interface. The user gesture may be a selection of an icon (e.g., icon 210 (FIG. 2F)) to move from a currently display list (e.g., the second list of items) to a previously displayed list of items (e.g., the first list of items).

In response to the user input, process 300 replaces, using a second transition graphic, the second plurality of objects with the first plurality of objects based on the order at step 314. For example, the system may assign a third transition effect to the first plurality of objects based on the first plurality of objects being generated for display before the second plurality of objects. The system may then assign a fourth transition effect to the second plurality of objects based on the first plurality of objects being generated for display before the second plurality of objects. The system may then generate for display, in the second transition graphic, the third transition effect for the first plurality of objects and the fourth transition effect for the second plurality of objects. For example, the system may replace the second list of items with a display of the first list of items.

In some embodiments, when generating for display the third transition effect for the first plurality of objects and the fourth transition effect for the second plurality of objects, the system may generate for display the first plurality of objects transitioning, in a third direction, from a third plane to a second plane, wherein the third plane and second plane are parallel to the display screen of the electronic device. The system may further generate for display the second plurality of objects transitioning, in the third direction, from the second plane to a fourth plane, wherein the second plane and fourth plane are parallel to the display screen of the electronic device. For example, the system may apply different effects to the second list as it is replaced on the display screen compared to the effects to the first list as it appears on the display screen. By applying the different effects, the system intuitively indicates to the user the order of the lists. Additionally, by applying the different effects, the system indicates whether the system is presenting a new organizational relationship or whether the system is displaying a previously presented organizational relationship.

In some embodiments, the system may generate for display the first object simultaneously with the second plurality of objects. For example, a selected object may become a header for a plurality of objects corresponding to the selected object as shown in FIG. 2E. For example, the system may display an object selected in a first list as the header for a second list.

Figure 4:
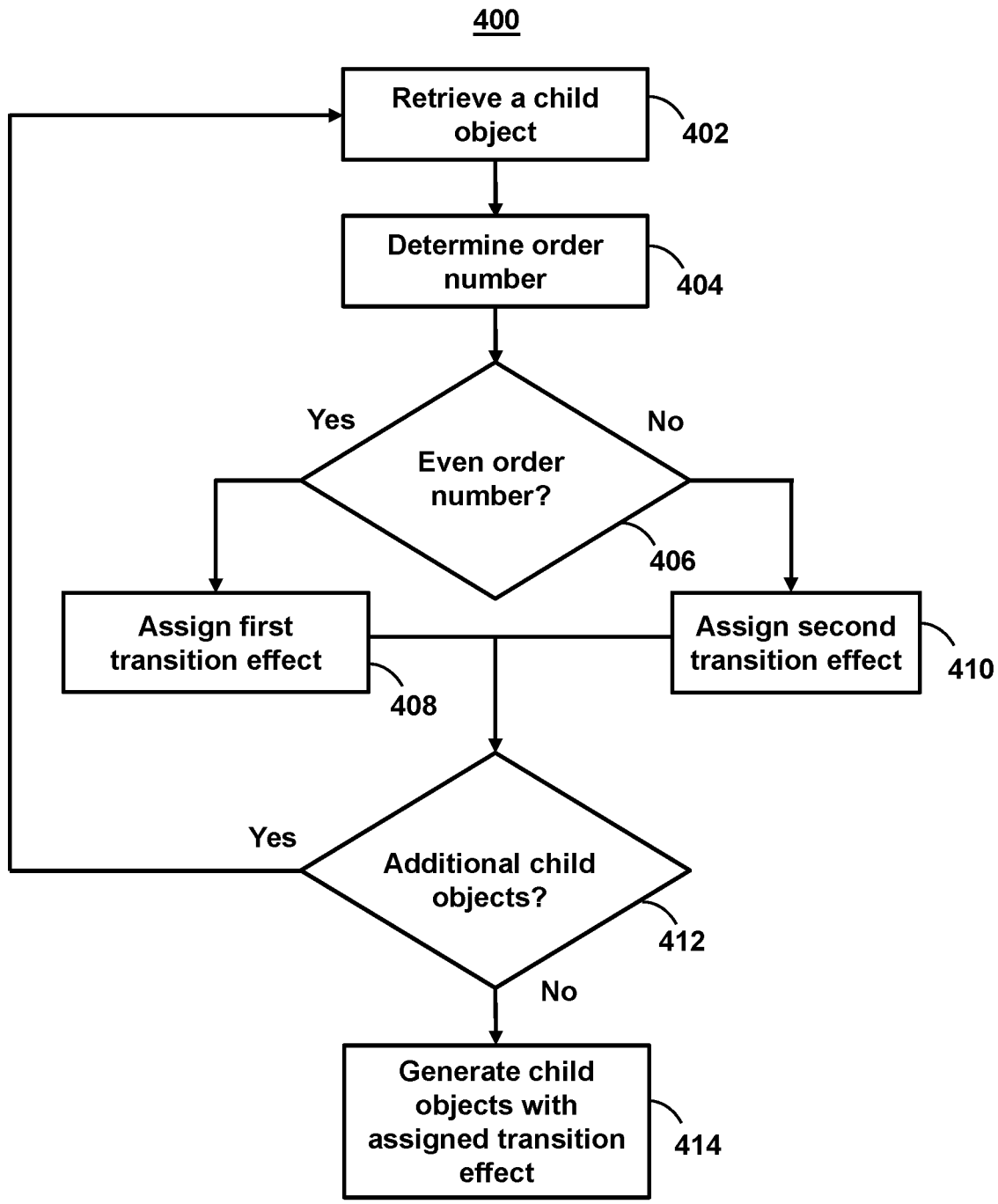
FIG. 4 shows a flowchart of steps for generating transition effects based on organizational relationships between objects in accordance with one or more embodiments.

FIG. 4 shows a flowchart of steps for generating transition effects based on organizational relationships between objects in accordance with one or more embodiments. For example, in order to generate for display a transition graphic the system may generate one or more states (e.g., as shown in relation to FIGS. 2B-2E). Each state may include a plurality of characteristics. For example, each state may correspond to a given size, shape, plane of display, angle of display, resolution, clarity, and/or perspective in which the object is displayed. The progression of the object through a series of states may comprise a transition graphic.

For example, in one example, the transition graphic may comprise an animation of the first plurality of objects transitioning from a first plane to a second plane in a second direction, wherein both the first plane and the second plane are parallel to a display screen of the portable electronic device. In another example, the transition graphic may comprise an animation of the first plurality of objects transitioning from a first perspective to a second perspective in a second direction, wherein the first perspective and the second perspective have different vanishing point locations in the user interface (and/or number vanishing points in embodiments using two or three point perspectives). For example, as the system traverses through multiple layers of categories and sub-categories of objects (e.g., branches of a hierarchical tree structure), the system modifies the layers to appear to recede to a vanishing point in the distance (e.g., a plane parallel to, and behind, the display screen from the perspective of the user). The system presents the "active" layer (e.g., the currently generated layer and the layer in the foreground of the display screen) to remain at a consistent width. By modifying the layers to appear to recede to a vanishing point in the distance, the system allows for an infinite number of layers to be displayed.

In yet another example, the system may generate for display a first child object transitioning, in a first direction, from a first plane to a second plane, wherein the first plane is orthogonal to a display screen of the electronic device, and wherein the second plane is parallel to the display screen of the electronic device. Simultaneously, the system may generate for display the second child object transitioning, in a second direction, from the first plane to the second plane, wherein the first direction is opposite to the second direction. In each of these examples, the system may first perform one or more determinations related to the order of different objects or plurality of objects.

At step 402, process 400 retrieves a child object. For example, the system may access a database that in addition to listing a hierarchical tree for a node (e.g., second object 208 (FIG. 2B)) may also indicate the relationships between objects and tree nodes in the hierarchical tree. These relationships may include data on how many child objects a selected object has. The system may therefore determine a tree node in the hierarchical tree for an object and then determine a number of child nodes corresponding to the tree node. For example, in response to a user selecting an object (second object 208 (FIG. 2B)), the system may determine a first child object (e.g., first object 224 (FIG. 2E)) and a second child object (second object 226 (FIG. 2E)) related to the selected object. To do so, the system may determine a first child node and the second child node related to the node of the selected object, and then determine the objects corresponding to these child nodes.

At step 404, process 400 determines an order number for a child object in the plurality of child objects. For example, in one embodiment, the system may determine a first and second order number for a first and second child object, wherein the first and second order numbers indicate positions of the first and second child objects, respectively, in second plurality of objects. For example, in response to a user selecting second object 208 (FIG. 2B)), the system may determine the order of first object 224 (FIG. 2E) and second object 226 (FIG. 2E) in second plurality of objects 220 (FIG. 2E).

At step 406, process 400 determines an evenness and/or oddness for the retrieve child object. For example, in order to generate the transition graphic, the system may determine a mathematical evenness and/or oddness for a first order number and the second order number. For example, the system may apply different transition effects to a first and/or second object based on the order. To have an "unfolding" animation as shown in FIGS. 2B-2E, the system applies different transition effects to alternating objects in the plurality of objects. One technique for achieve this is to determine a mathematical evenness and/or oddness of each object in the plurality of objects.

If process 400 determines that the retrieved child object has an evenness (and/or not an oddness), process 400 proceeds to step 408 and assigns a first transition effect. If process 400 determines that the retrieved child object does not have an evenness (and/or has an oddness), process 400 proceeds to step 410 and assigns a second transition effect. For example, the system may assign a first transition effect to a first child object based on determining the first child object has a first mathematical evenness and/or oddness. The system may assign a second transition effect to the second child object based on determining the second child object has a second mathematical evenness and/or oddness.

For example, the system may assign a transition effect that causes the system to generate for display the first child object transitioning, in a first direction, from a first plane to a second plane, wherein the first plane is orthogonal to a display screen of the electronic device, and wherein the second plane is parallel to the display screen of the electronic device. The system may alternatively or additionally may assign a transition effect that causes the system to generate for display the second child object transitioning, in a second direction, from the first plane to the second plane, wherein the first direction is opposite to the second direction.

At step 412, process 400 determines if there are additional child objects in the plurality of child objects. If so, process 400 returns to step 402 and retrieves another child object. If process 400 determines that there are no additional child objects, process 400 proceeds to step 414. At step 414, process 400 generates one or more child objects with an assigned transition effect. For example, the system may generate for display, in a first transition graphic, a first transition effect for a child object and a second transition effect for a second child.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method of navigating media content on an electronic device, the method comprising: generating for display, in a user interface, a first plurality of objects; receiving, using control circuitry of the electronic device, a selection of a first object in the first plurality of objects; in response to receiving the selection of the first object, determining, using the control circuitry, a second plurality of objects related to the first object; generating for display, using a first transition graphic, a second plurality of objects to replace the first plurality of objects in the user interface; storing, in memory of the electronic device, an order in which the first plurality of objects and the second plurality of objects were generated for display; receiving, using the control circuitry, a user gesture; and in response to the user gesture, replacing, using a second transition graphic, the second plurality of objects with the first plurality of objects based on the order.

2. The method of embodiment 1, further comprising generating for display the first object simultaneously with the second plurality of objects.

3. The method of embodiment 1 or 2, wherein the first transition graphic comprises an animation with a first time length and wherein the second transition graphic comprises an animation with a second time length, wherein the first time length is longer than the second time length.

4. The method of any one of embodiments 1-3, wherein a perspective of one or more of the second plurality of objects changes during the first transition graphic, and wherein a level of clarity of one or more of the second plurality of objects changes during the second transition graphic.

5. The method of any one of embodiments 1-4, wherein the first transition graphic comprises an animation of the first plurality of objects transitioning from a folded state to an unfolded state.

6. The method of any one of embodiments 1-5, wherein determining a second plurality of objects related to the first object comprises: accessing a database listing a hierarchical tree for the first object and relationships between tree nodes in the hierarchical tree and objects; determining a tree node in the hierarchical tree for the first object; determining a first child node and a second child node for the tree node; and determining the first child object and the second child object related to the first child node and the second child node, respectively.

7. The method of any one of embodiments 1-6, wherein generating for display the second plurality of objects using the first transition graphic comprises: determining a first order number for the first child object, wherein the first order number indicates a position of the first child object in second plurality of objects; determining a second order number for the second child object, wherein the second order number indicates a position of the second child object in second plurality of objects; determining a mathematical evenness or oddness for the first order number and the second order number; assigning a first transition effect to the first child object based on determining the first child object has a first mathematical evenness or oddness; assigning a second transition effect to the second child object based on determining the second child object has a second mathematical evenness or oddness; and generating for display, in the first transition graphic, the first transition effect for the first child object and the second transition effect for the second child.

8. The method of embodiment 7, wherein generating for display the first transition effect for the first child object and the second transition effect for the second child object comprises: generating for display the first child object transitioning, in a first direction, from a first plane to a second plane, wherein the first plane is orthogonal to a display screen of the electronic device, and wherein the second plane is parallel to the display screen of the electronic device; and generating for display the second child object transitioning, in a second direction, from the first plane to the second plane, wherein the first direction is opposite to the second direction.

9. The any one of embodiments 1-8, wherein replacing, using the second transition graphic, the second plurality of objects with the first plurality of objects based on the order comprises: assigning a third transition effect to the first plurality of objects based on the first plurality of objects being generated for display before the second plurality of objects; and assigning a fourth transition effect to the second plurality of objects based on the first plurality of objects being generated for display before the second plurality of objects; and generating for display, in the second transition graphic, the third transition effect for the first plurality of objects and the fourth transition effect for the second plurality of objects.

10. The method of claim 9, wherein generating for display the third transition effect for the first plurality of objects and the fourth transition effect for the second plurality of objects comprises: generating for display the first plurality of objects transitioning, in a third direction, from a third plane to a second plane, wherein the third plane and second plane are parallel to the display screen of the electronic device; and generating for display the second plurality of objects transitioning, in the third direction, from the second plane to a fourth plane, wherein the second plane and fourth plane are parallel to the display screen of the electronic device.

11. A tangible, non-transitory, machine-readable medium storing instructions that when executed by a data processing apparatus cause the data processing apparatus to perform operations comprising those of any of embodiments 1-10.

12. A system comprising means for executing embodiments 1-10.

What is claimed is:

1. A method of navigating media content implemented by a computer system that comprises one or more processors executing computer program instructions that, when executed, perform the method, the method comprising:

generating for display, in a user interface displayed on a portable electronic device, a first plurality of objects;

receiving a user selection of a first object in the first plurality of objects;

in response to receiving the selection of the first object, determining a second plurality of objects related to the first object, wherein determining a second plurality of
objects related to the first object comprises:
accessing a database listing a hierarchical tree for the
first object and relationships between objects and
tree nodes in the hierarchical tree;
determining a tree node in the hierarchical tree for the
first object;
determining a first child node and a second child node
for the tree node; and
determining the first child object and the second child
object related to the first child node and the second
child node, respectively;
generating for display, using a first transition graphic, a
second plurality of objects to replace the first plurality
of objects in the user interface, wherein the first transition graphic comprises an animation of the second
plurality of objects transitioning from a folded state to
an unfolded state in a first direction, wherein generating
for display the second plurality of objects using the first
transition graphic comprises:
determining a first order number for the first child object,
wherein the first order number indicates a position of
the first child object in second plurality of objects;
determining a second order number for the second child
object, wherein the second order number indicates a
position of the second child object in second plurality
of objects;
determining a mathematical evenness or oddness for the
first order number and the second order number;
assigning a first transition effect to the first child object
based on determining the first child object has a first
mathematical evenness or oddness;
assigning a second transition effect to the second child
object based on determining the second child object has
a second mathematical evenness or oddness; and
generating for display, in the first transition graphic, the
first transition effect for the first child object and the
second transition effect for the second child;
storing an order in which the first plurality of objects and
the second plurality of objects were generated for
display;
receiving a user gesture; and
in response to the user gesture, replacing, using a second
transition graphic, the second plurality of objects with
the first plurality of objects based on the order, wherein
second transition graphic comprises an animation of the
first plurality of objects transitioning from a first plane
to a second plane in a second direction, wherein both
the first plane and the second plane are parallel to a
display screen of the portable electronic device.

2. A method of navigating media content on an electronic
device, the method comprising:
generating for display, in a user interface, a first plurality
of objects;
receiving, using control circuitry of the electronic device,
a selection of a first object in the first plurality of
objects;
in response to receiving the selection of the first object,
determining, using the control circuitry, a second plurality of objects related to the first object, wherein
determining a second plurality of objects related to the
first object comprises:
accessing a database listing a hierarchical tree for the
first object and relationships between objects and
tree nodes in the hierarchical tree;
determining a tree node in the hierarchical tree for the
first object;
determining a first child node and a second child node
for the tree node; and
determining the first child object and the second child
object related to the first child node and the second
child node, respectively;
generating for display, using a first transition graphic, a
second plurality of objects to replace the first plurality
of objects in the user interface, wherein generating for
display the second plurality of objects using the first
transition graphic comprises:
determining a first order number for the first child object,
wherein the first order number indicates a position of
the first child object in second plurality of objects;
determining a second order number for the second child
object, wherein the second order number indicates a
position of the second child object in second plurality
of objects;
determining a mathematical evenness or oddness for the
first order number and the second order number;
assigning a first transition effect to the first child object
based on determining the first child object has a first
mathematical evenness or oddness;
assigning a second transition effect to the second child
object based on determining the second child object has
a second mathematical evenness or oddness; and
generating for display, in the first transition graphic, the
first transition effect for the first child object and the
second transition effect for the second child;
storing, in memory of the electronic device, an order in
which the first plurality of objects and the second
plurality of objects were generated for display;
receiving, using the control circuitry, a user input; and
in response to the user input, replacing, using a second
transition graphic, the second plurality of objects with
the first plurality of objects based on the order.

3. The method of claim 2, further comprising generating
for display the first object simultaneously with the second
plurality of objects.

4. The method of claim 2, wherein the first transition
graphic comprises an animation with a first time length and
wherein the second transition graphic comprises an animation with a second time length, wherein the first time length
is longer than the second time length.

5. The method of claim 2, wherein a perspective of one or
more of the second plurality of objects changes during the
first transition graphic, and wherein a level of clarity of one
or more of the second plurality of objects changes during the
second transition graphic.

6. The method of claim 2, wherein the first transition
graphic comprises an animation of the second plurality of
objects transitioning from a folded state to an unfolded state.

7. The method of claim 2, wherein generating for display
the first transition effect for the first child object and the
second transition effect for the second child object comprises:
generating for display the first child object transitioning,
in a first direction, from a first plane to a second plane,
wherein the first plane is orthogonal to a display screen
of the electronic device, and wherein the second plane
is parallel to the display screen of the electronic device;
and
generating for display the second child object transitioning, in a second direction, from the first plane to the
second plane, wherein the first direction is opposite to
the second direction.

8. The method of claim 2, wherein replacing, using the second transition graphic, the second plurality of objects with the first plurality of objects based on the order comprises:
  assigning a third transition effect to the first plurality of objects based on the first plurality of objects being generated for display before the second plurality of objects;
  assigning a fourth transition effect to the second plurality of objects based on the first plurality of objects being generated for display before the second plurality of objects; and
  generating for display, in the second transition graphic, the third transition effect for the first plurality of objects and the fourth transition effect for the second plurality of objects.

9. The method of claim 8, wherein generating for display the third transition effect for the first plurality of objects and the fourth transition effect for the second plurality of objects comprises:
  generating for display the first plurality of objects transitioning, in a third direction, from a third plane to a second plane, wherein the third plane and second plane are parallel to a display screen of the electronic device; and
  generating for display the second plurality of objects transitioning, in the third direction, from the second plane to a fourth plane, wherein the second plane and fourth plane are parallel to a display screen of the electronic device.

10. A system for navigating media content, the system comprising:
  memory configured to store an order in which pluralities of objects are generated for display; and
  control circuitry configured to:
    generate for display, in a user interface, a first plurality of objects;
    receive a selection of a first object in the first plurality of objects;
    determine a second plurality of objects related to the first object in response to receiving the selection of the first object by:
      accessing a database listing a hierarchical tree for the first object and relationships between objects and tree nodes in the hierarchical tree;
      determining a tree node in the hierarchical tree for the first object;
      determining a first child node and a second child node for the tree node; and
      determining the first child object and the second child object related to the first child node and the second child node, respectively;
    generate for display, using a first transition graphic, a second plurality of objects to replace the first plurality of objects in the user interface by:
      determining a first order number for the first child object, wherein the first order number indicates a position of the first child object in second plurality of objects;
      determining a second order number for the second child object, wherein the second order number indicates a position of the second child object in second plurality of objects;
      determining a mathematical evenness or oddness for the first order number and the second order number;
      assigning a first transition effect to the first child object based on determining the first child object has a first mathematical evenness or oddness;
      assigning a second transition effect to the second child object based on determining the second child object has a second mathematical evenness or oddness; and
      generating for display, in the first transition graphic, the first transition effect for the first child object and the second transition effect for the second child;
    receiving a user input; and
    replace, using a second transition graphic, the second plurality of objects with the first plurality of objects based on the order in which the first plurality of objects and the second plurality of objects were generated for display in response to the user input.

11. The system of claim 10, wherein the control circuitry is further configured to generate for display the first object simultaneously with the second plurality of objects.

12. The system of claim 10, wherein the first transition graphic comprises an animation with a first time length and wherein the second transition graphic comprises an animation with a second time length, wherein the first time length is longer than the second time length.

13. The system of claim 10, wherein a perspective of one or more of the second plurality of objects changes during the first transition graphic, and wherein a level of clarity of one or more of the second plurality of objects changes during the second transition graphic.

14. The system of claim 10, wherein the first transition graphic comprises an animation of the second plurality of objects transitioning from a folded state to an unfolded state.

15. The system of claim 10, wherein the control circuitry configured to generate for display the first transition effect for the first child object and the second transition effect for the second child object is further configured to:
  generate for display the first child object transitioning, in a first direction, from a first plane to a second plane, wherein the first plane is orthogonal to a display screen of an electronic device, and wherein the second plane is parallel to the display screen of the electronic device; and
  generate for display the second child object transitioning, in a second direction, from the first plane to the second plane, wherein the first direction is opposite to the second direction.

16. The system of claim 10, wherein the control circuitry configured to replace, using the second transition graphic, the second plurality of objects with the first plurality of objects based on the order is further configured to:
  assigning a third transition effect to the first plurality of objects based on the first plurality of objects being generated for display before the second plurality of objects;
  assigning a fourth transition effect to the second plurality of objects based on the first plurality of objects being generated for display before the second plurality of objects; and
  generating for display, in the second transition graphic, the third transition effect for the first plurality of objects and the fourth transition effect for the second plurality of objects.

17. The system of claim 16, wherein the control circuitry configured to generate for display the third transition effect for the first plurality of objects and the fourth transition effect for the second plurality of objects is further configured to:
- generating for display the first plurality of objects transitioning, in a third direction, from a third plane to a second plane, wherein the third plane and second plane are parallel to a display screen of an electronic device; and
- generating for display the second plurality of objects transitioning, in the third direction, from the second plane to a fourth plane, wherein the second plane and fourth plane are parallel to a display screen of an electronic device.

\* \* \* \* \*